(12) United States Patent
Mitchem et al.

(10) Patent No.: US 12,132,863 B1
(45) Date of Patent: *Oct. 29, 2024

(54) ARTIFICIAL INTELLIGENCE ASSISTANCE FOR CUSTOMER SERVICE REPRESENTATIVES

(71) Applicant: UNITED SERVICES AUTOMOBILE ASSOCIATION (USAA), San Antonio, TX (US)

(72) Inventors: Sean C. Mitchem, San Antonio, TX (US); Curtis M. Bell, San Antonio, TX (US); Kou Qunying, San Antonio, TX (US); Michael J. Maciolek, Boerne, TX (US); Donnette Moncrief Brown, San Antonio, TX (US); Cory A. Matheson, Celina, TX (US); Yevgeniy V. Khmelev, San Antonio, TX (US); Janelle D. Dziuk, Falls City, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,319

(22) Filed: May 10, 2023

Related U.S. Application Data

(63) Continuation of application No. 17/005,064, filed on Aug. 27, 2020, now Pat. No. 11,706,337.

(60) Provisional application No. 62/893,498, filed on Aug. 29, 2019.

(51) Int. Cl.
*H04M 3/493* (2006.01)
*G06F 40/40* (2020.01)
*G06N 20/00* (2019.01)
*G06Q 30/016* (2023.01)
*G06Q 30/0217* (2023.01)

(52) U.S. Cl.
CPC .......... *H04M 3/4936* (2013.01); *G06F 40/40* (2020.01); *G06N 20/00* (2019.01); *G06Q 30/016* (2013.01); *G06Q 30/0217* (2013.01)

(58) Field of Classification Search
None
See application file for complete search history.

(56) References Cited

U.S. PATENT DOCUMENTS

| 8,693,644 B1 * | 4/2014 | Hodges, Jr. | H04M 3/5175 379/265.06 |
| 11,024,299 B1 * | 6/2021 | Drake | G10L 15/197 |
| 11,593,466 B1 * | 2/2023 | Kuttappa | G10L 25/63 |

(Continued)

*Primary Examiner* — Antim G Shah
(74) *Attorney, Agent, or Firm* — BakerHostetler

(57) ABSTRACT

A method comprises receiving, by an artificial intelligence (AI) assistant, an input via a communication session between a customer device and a customer service representative device, wherein the AI assistant is trained using machine learning on a database containing previously-received inputs, previously-delivered outputs, and the previous results of previously-delivered outputs; processing, by the AI assistant, the input; determining, by the AI assistant, an output based on the processing of the input, wherein the output includes one of a suggested statement, change in tone, or correction for the customer service representative; and sending, by the AI assistant, an indication of the output to the customer service representative device.

20 Claims, 4 Drawing Sheets

(56) References Cited

U.S. PATENT DOCUMENTS

| | | | |
|---|---|---|---|
| 11,706,337 B1* | 7/2023 | Mitchem | G06F 40/30 |
| | | | 704/270.1 |
| 2015/0142704 A1* | 5/2015 | London | G06F 16/90332 |
| | | | 706/11 |
| 2018/0115645 A1* | 4/2018 | Iyer | G06Q 10/063112 |
| 2019/0124202 A1* | 4/2019 | Dubey | G06Q 10/063112 |
| 2019/0164539 A1* | 5/2019 | Schmidt | G06F 40/284 |
| 2019/0227822 A1* | 7/2019 | Azmoon | G06F 40/186 |
| 2019/0394333 A1* | 12/2019 | Jiron | G06F 21/32 |

* cited by examiner

ARTIFICIAL INTELLIGENCE ASSISTANCE FOR CUSTOMER SERVICE REPRESENTATIVES

CROSS-REFERENCE TO RELATED APPLICATION

This patent application is a continuation and claims priority to U.S. patent application Ser. No. 17/005,064, filed Aug. 27, 2020, which application claims priority to and the benefit of provisional patent application 62/893,498 filed Aug. 29, 2019, which is incorporated herein by reference in its entirety.

BACKGROUND

A Customer service representative (CSR) may assist a customer remotely via a communication session. The CSR may follow a list of prompts during the communication session, such as to determine questions or responses to communicate to the customer. The list of prompts may comprise a computerized workflow. However, the workflow may lack the capacity to guide the CSR through unexpected situations. Unresponsiveness or inaccuracy of CSR statements may result in customer dissatisfaction.

SUMMARY

In an embodiment, a method comprises receiving, by an artificial intelligence (AI) assistant, an input via a communication session between a customer device and a customer service representative device, wherein the AI assistant is trained using machine learning on a database containing previously-received inputs, previously-delivered outputs, and the previous results of previously-delivered outputs; processing, by the AI assistant, the input; determining, by the AI assistant, an output based on the processing of the input, wherein the output includes one of a suggested statement, change in tone, or correction for the customer service representative; and sending, by the AI assistant, an indication of the output to the customer service representative device.

This summary is provided to describe only one example embodiment supported by the disclosure, and should not be read to limit other portions of this disclosure or any claims related thereto.

BRIEF DESCRIPTION OF THE DRAWINGS

The following drawings show generally, by way of example, but not by way of limitation, various examples discussed in the present disclosure. In the drawings.

DETAILED DESCRIPTION

Customer service representatives (CSRs) may assist customers remotely. For example, CSRs may communicate with customers via voice, text, messaging, and/or chat. The CSRs may follow workflows running on computing devices. The workflows may comprise interfaces, such as user interfaces and/or interactive interfaces. The workflows may provide the CSRs with statements, questions, and/or answers. The workflows may provide the CSRs with steps. The workflows may indicate how the CSRs should respond to customer statements, questions, and/or answers. However, the workflows may be limited in their capacity to provide instructions to CSRs for all possible scenarios, such as possible customer statements, questions, and/or answers. The workflows may not account for non-verbal aspects of the communication, such as voice tone, context, and/or diction. Also, the workflows may lack the capacity to flag errors in any statements made by CSRs and/or potential fraud on behalf of the customer.

CSR service may be improved using an artificial intelligence (AI) assistant. For example, the responsiveness, accuracy, and/or sensitivity of CSR communications may be improved using an AI assistant. The AI assistant may listen and/or have access to a conversation between a CSR and a customer. Based on the customer's questions, responses, and/or statements, the AI assistant may determine questions, responses, or statements for the CSR and communicate the questions, responses, or statements to the CSR. The AI assistant may work in conjunction with a CSR workflow, such as by tracking the CSR's progress in the workflow and/or by outputting prompts to the CSR via the workflow.

Figure 1:
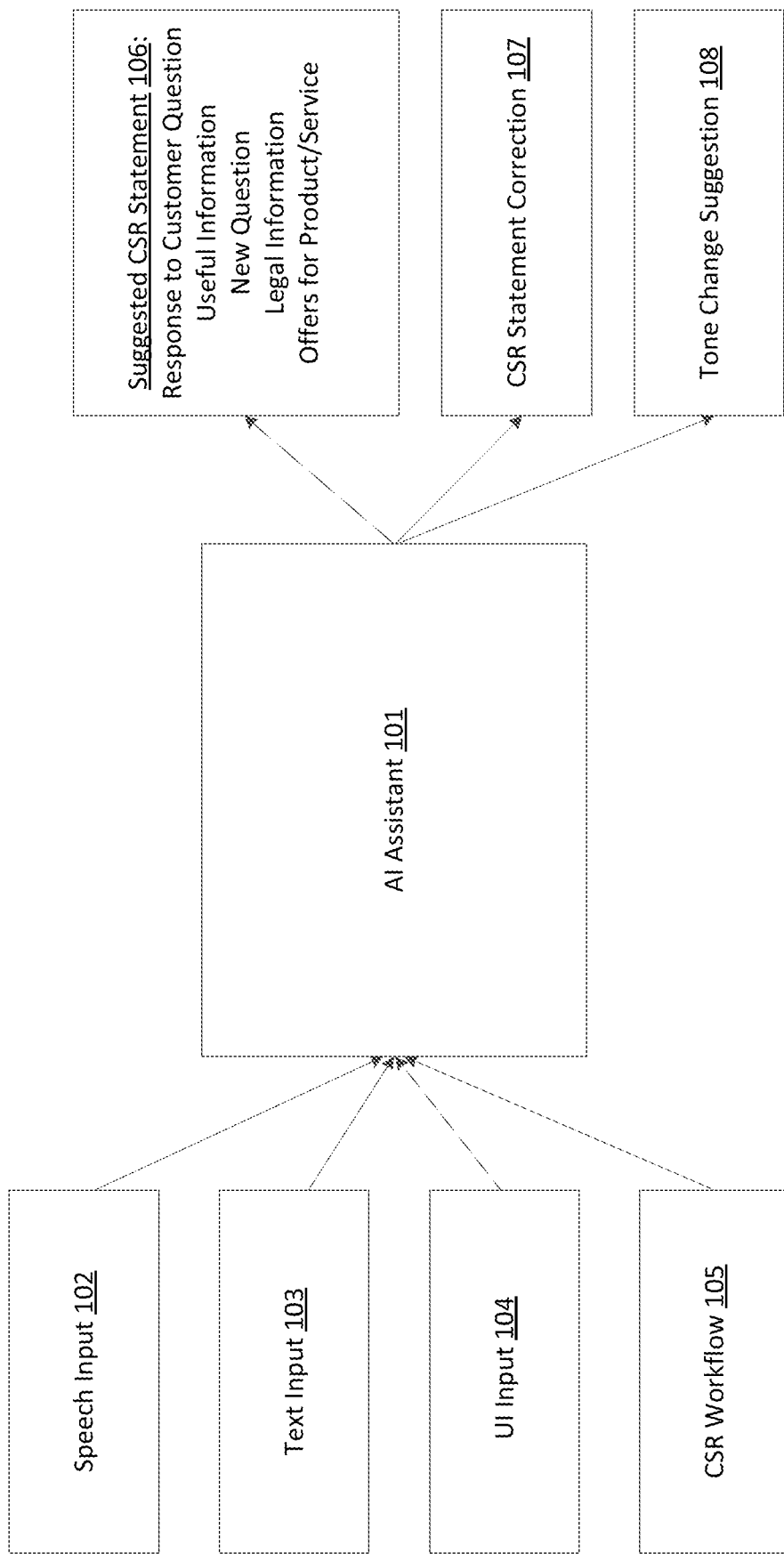
FIG. 1 shows example AI assistant inputs and outputs.

FIG. 1 shows an AI assistant 101. The AI assistant 101 may receive one or more inputs during a communication session between a CSR and a customer. The input may comprise a speech input 102. The speech input 102 may be received via an audio (e.g., voice) call and/or video call, such as between a CSR and a customer. The speech input 102 may comprise speech of a CSR. The speech input 102 may comprise speech of a customer. The AI assistant 101 may process the speech input 102, such as using automatic speech recognition (ASR), computer speech recognition, natural language processing (NLP), and/or other speech recognition technology. The AI assistant 101 may process the speech input 102 using speech to text (STT). The text may comprise English or another natural language. The text may comprise a language configured for computers and/or AI, such as a programming language. The AI assistant 101 may translate the speech input 102 from one language to another language, such as before performing further processing on the speech input 102.

The AI assistant 101 may determine words used in the speech input 102. The AI assistant 101 may extract key words from the speech input 102. The AI assistant 101 may contextually analyze the words, such as to correct similar-sounding words, to determine tone and/or emotion associated with the words, and/or to determine meaning of the speech input 102.

The AI assistant 101 may translate the speech input 102 from one language to another language. For example, the AI assistant 101 may translate the speech input 102 from a language spoken by the customer to a language spoken by the CSR. The AI assistant 101 may output the translated speech input 102 to the CSR, such as via audio or text.

The AI assistant 101 may determine a volume of the speech input 102. The AI assistant 101 may determine a pace of the speech input 102. The AI assistant 101 may determine a pitch of the speech input 102. The AI assistant 101 may determine an inflection of the speech input 102. The AI assistant 101 may determine an tone and/or emotion associated with the speech input 102, such as based on the words used, volume, pace, inflection, and/or pitch of the speech input 102. The AI assistant 101 may determine a change in the speech input 102, such as based on a change in the words used, volume, pace, inflection, and/or pitch of the speech input 102.

The input may comprise a text input 103. The text input 103 may comprise text received from a customer or a CSR. The text input 103 may be received via a texting, messaging, and/or chat program and/or application. The AI assistant 101 may process the text input 103 using NLP and/or other speech recognition technology. The AI assistant 101 may determine words used in the text input 103. The AI assistant 101 may extract key words from the text input 103. The AI assistant 101 may contextually analyze the words, such as to correct similar-sounding words, to determine tone and/or emotion associated with the words, and/or to determine meaning associated with the text input 103. The AI assistant 101 may determine a change associated with the text input 103, such as a change in tone and/or emotion associated with the text input 103.

The AI assistant 101 may translate the text input 103 from one language to another language. For example, the AI assistant 101 may translate the text input 103 from a language spoken by the customer to a language spoken by the CSR. The AI assistant 101 may output the translated text input 103 to the CSR, such as via audio or text. The AI assistant 101 may translate the text input 103 from one language to another language, such as before performing further processing on the text input 103.

The input may comprise an input 104 received via a user interface (UI). The UI may comprise a graphic user interface (GUI). The UI may comprise a menu. The UI may comprise a list. The UI may comprise a messaging and/or chat box. The UI may be associated with a customer program and/or web page. The UI may comprise a program running on a device associated with the customer. The UI may be associated with a CSR program and/or web page. The UI may comprise the CSR workflow. The UI may comprise a program running on a device associated with the CSR.

The UI input 104 may comprise a selection (e.g., a mouse selection, a touchscreen selection) of an option on a menu displayed on the UI. The UI input 104 may comprise text input by the customer and/or the CSR in a chat and/or messaging box. The UI input 104 may comprise text input by the customer and/or the CSR in a field displayed on the UI. The UI may comprise a non-graphic user interface, such as a UI associated with a digital assistant. The UI input 104 may comprise a voice communication, such as a command or a selection to a digital assistant.

The AI assistant 101 may process the UI input 104 using a speech recognition technology. The AI assistant 101 may determine words used in the UI input 104. The AI assistant 101 may extract key words from the UI input 104. The AI assistant 101 may contextually analyze the words, such as to correct similar-sounding words, to determine emotion associated with the words, and/or to determine meaning associated with the UI input 104.

The input may comprise a CSR workflow 105. The CSR workflow 105 may comprise a UI (e.g., GUI), an application, and/or another program running on a computer of the CSR. The CSR workflow 105 may comprise a flowchart. The CSR workflow 105 may show a sequence of question, answers, and/or statements. The CSR workflow 105 may indicate questions for the CSR to ask the customer. The CSR workflow 105 may indicate possible user responses to the CSR questions. The CSR workflow 105 may indicate a follow-up statement to each of the possible user responses. The AI assistant 101 may interact with the CSR workflow 105, such as to track the CSR's progress through the CSR workflow 105. The AI assistant 101 may track the CSR's progress through the CSR workflow 105, such as based on the CSR's tracking and/or other input indicative of the CSR's progress in the CSR workflow 105.

The AI assistant 101 may process the input. Processing the input may comprise determining one or more characteristics of the input. The characteristics may comprise one or more of a tone, emotion, key word, meaning, duration, volume, pace, inflection, pitch, and/or context of the input. Processing the one or more inputs may comprise determining a change in one or more of the characteristics.

Processing the one or more inputs may comprise assigning the input one or more classification codes. A classification codes may be associated with one or more of the characteristics. For example, the classification codes may be associated with key words. The classification codes may be associated with groups of words having similar meanings (e.g., synonyms). The classification codes may be associated with groups of words denoting a tone and/or emotion. The classification code may comprise a binary code, an alphanumeric code, and/or a symbol code. The classification codes may be accessed from a database, key, and/or dictionary, as examples. The classification codes may be pre-generated. The classification codes may be fed to the AI assistant, such as to be used as a training set. The classification codes may be generated by the AI assistant, such as using a machine learning technique. The classification codes may be generated by one or more nodes of an artificial neural network.

The AI assistant 101 may determine an output. The AI assistant 101 may determine the output based on the input. The AI assistant 101 may determine the output based on processing the input. The AI assistant 101 may determine the output based on information associated with the customer, such as a customer account and/or a database of customer information. The AI assistant 101 may determine the output based on data from an artificial neural network. The AI assistant 101 may determine the output based on historical information associated with other communication sessions with the customer and/or other customers.

The AI assistant 101 may deliver the output to the CSR. The output may be delivered via a notification on the computing device of the CSR, such as a text alert in a new window. The output may be via the workflow. For example, the output may appear as a next step on the workflow. The output may appear as a notification in the workflow. The notification may overlay a portion of the workflow. The output may be delivered via audio. For example, the output may be via a speaker, an earpiece, or a headpiece. The output may be audible and/or visible to the CSR, but not to the customer.

The output may comprise a suggested CSR statement 106. The suggested CSR statement 106 may comprise a response to a customer question. For example, if the CSR is associated with an insurance company and the customer is calling the insurance company to ask if their insurance plan has a certain type of coverage, the AI assistant 101 may output a response indicating if the customer's plan has that type of coverage.

The suggested CSR statement 106 may comprise useful information. For example, if the customer is calling the insurance company to file an insurance claim, the AI assistant 101 may output information about a deductible associated with the customer's insurance plan. The suggested CSR statement 106 may comprise a new question for the CSR to ask the customer. The new question may be a next question on the CSR workflow 105.

If the CSR is not using a workflow, the AI assistant 101 may provide prompts, such as of a next question and/or a response, in lieu of a workflow. The AI assistant 101 may provide prompts based on a determination that the workflow program and/or the CSR's device has crashed or that connection has been lost. The AI assistant 101 may determine the new question based on a determination that further information is needed from the customer. The AI assistant 101 may indicate what information is needed to the CSR and/or formulate the question to solicit the needed information.

The suggested CSR statement 106 may comprise legal information. The legal information may comprise a disclaimer. The legal information may comprise an alert, such as to warn the CSR not to provide certain information or obtain certain information. The legal information may comprise an alert that certain information is sensitive and should be treated as such. For example, the AI assistant 101 may alert the CSR that information provided by the customer is personal identifying information (PII), such as an account number, a name, a birthday, a social security number, a telephone number, and/or an address. The AI assistant 101 may alert the CSR that information provided by the customer is verification information, such as an answer to a security question or a password. The AI assistant 101 may alert the CSR that information provided by the customer is payment information, such as a credit card or debit card number, a routing number, or a bank account number.

Based on a determination that information is sensitive, the AI assistant 101 may determine if the CSR is authorized to receive the information. The AI assistant 101 may determine if the CSR is authorized to receive the information based on a training level, certification level, and/or license of the CSR. If the CSR is not authorized to receive sensitive information, the AI assistant may cause the communication session to be handed-off to a different CSR, such as a CSR authorized to receive the information. Based on a determination that the CSR is not authorized to receive sensitive information, the AI assistant may censor the information from the CSR, such as by temporarily silencing audio from the customer to the CSR or preventing the display of the information on the CSR's device. The AI assistant may record the sensitive information, such as in a secure memory and/or database.

The legal information may comprise an alert of potential fraud. Potential fraud may be determined based on speech input of a customer. For example, characteristics of the voice of the customer may be matched to characteristics of a voice of a known fraudster. Alternatively, the AI assistant 101 may determine not to alert of potential fraud if the characteristics of the voice of the customer are matched to characteristics of a voice of a known and/or trusted customer. Potential fraud may be determined based on a number of questions, such as security questions, that the customer answers incorrectly. For example, if the customer answers a certain percentage of questions incorrectly, potential fraud may be determined and the CSR may be alerted.

Potential fraud may be determined based on a type of communication session and/or transaction occurring between the customer and the CSR. For example, communication sessions in which the CSR reveals sensitive information (e.g., PII, verification information, payment information, etc.) to the customer may be considered for fraud. As another example, transactions in which money or another asset is being transferred may be considered for fraud. Potential fraud may be determined based on a destination of a transfer. For example, if the destination is not associated with the customer, potential fraud may be determined.

Potential fraud may be determined based on a customer history. For example, patterns may be determined in a customer's transaction and/or communication history. The patterns may be based on customer location during communication sessions, times of day of communication session, methods of connecting to the communication sessions (e.g., user device used to communicate), and/or type of transactions, as examples. If a characteristic of the customer-CSR communication session is not consistent with that pattern, potential fraud may be determined. As an illustrative example, if the customer has previously called in the afternoon and a call is placed at night, it may be determined that the time of call is not consistent with an established call time pattern and potential fraud may be determined. As another example, if the customer usually communicates using a device and a communication session is initiated using a different device, potential fraud may be determined. As yet another example, if a customer usually performs certain transactions and the customer initiates a different transaction, potential fraud may be determined.

Based on a determination of potential fraud, the CSR may be alerted. The CSR may be prompted to terminate the communication session. The CSR may be prompted to authenticate the customer, such as by asking the customer verification and/or security questions. Based on the customer's responses to the verification and/or security questions, fraud may be confirmed and/or the customer may be verified. Based on the determination of potential fraud, the AI assistant may send an alert. The AI assistant may alert the CSR. The AI assistant and/or the CSR may send an alert to a known device and/or number of the customer.

The suggested CSR statement 106 may comprise a suggestion to offer a product or service. For example, the AI assistant 101 may prompt the insurance company CSR to suggest that the customer purchase an additional plan, increase a coverage amount, and/or add a coverage type. The AI assistant 101 may determine to suggest the product or service based on a determination that the customer has a positive tone and/or emotion. The positive tone and/or emotion may comprise a happy, eager, relieved, and/or calm tone and/or emotion, as examples. The AI assistant 101 may determine to suggest the product or service based on a determination that the customer has a neutral tone and/or emotion. The neutral tone and/or emotion may comprise a calm tone and/or emotion. The neutral tone and/or emotion may be determined based on a determination that the tone and/or emotion is neither positive nor negative.

The AI assistant 101 may determine to suggest the product or service based on information associated with the customer. For example, the AI assistant 101 may have access to an account associated with the customer. The AI assistant 101 may have access to a database of customer information. For example, based on the customer information, the AI assistant 101 may determine that the customer does not already have the product or service. The AI assistant 101 may determine to suggest the product or service based on one or more statements of the customer. For example, if the customer inquires about or purchases a similar product or service, the AI assistant 101 may determine to suggest the product or service. The AI assistant 101 may determine to suggest the product or service based on other customers having purchased the product or service and/or having made similar statements.

The output may comprise a correction 107. The output may comprise a correction of an error in a statement made by the CSR. For example, if the CSR makes an incorrect statement, the AI assistant may output a correction 107 comprising a correct version of the statement. The error may comprise an omission. For example, if the CSR does not make a disclaimer, the correction 107 may comprise an indication of the disclaimer. As another example, if the CSR skips a step on the workflow, the correction 107 may comprise an indication of the skipped step.

The output may comprise a tone change suggestion 108. Based on the determined words used by the customer or meaning of the customer input, the AI assistant 101 may determine that the words and/or input are associated with a negative tone and/or emotion. A negative tone and/or emotion may comprise a mad, anxious, impatient, frustrated, and/or sad tone and/or emotion, as examples. Based on the volume, pace, inflection, and/or pitch of the input, the AI assistant 101 may determine that the volume, pace, inflection, and/or pitch of the input is associated with a negative tone and/or emotion.

Based on the negative tone and/or emotion, the AI assistant 101 may suggest that the CSR change their tone. Based on the tone and/or emotion, the AI assistant 101 may dynamically determine CSR statements 106. For example, the if the tone and/or emotion is positive, the AI assistant 101 may determine an output comprising an offer for another service or product. As another example, if the tone and/or emotion is negative, the AI assistant 101 may determine an output comprising a new subject. The AI assistant 101 may select among a plurality of predetermined outputs based on the determined tone and/or emotion. Each of the plurality of predetermined outputs may have similar meaning, but different wordings and/or diction associated with different tones and/or emotions. Each of the plurality of predetermined outputs may comprise different statements (e.g., questions, responses, useful information, product/service suggestions) determined to be appropriate for the tone and/or emotion.

The AI assistant 101 may be configured to generate a transcript of the communication session between the customer and the CSR. The AI assistant 101 may be configured to save a copy of the transcript, such as to a database. The AI assistant 101 may send the transcript to the customer, the CSR, a supervisor of the CSR, or another entity. If a hand-off occurs of the customer from a first CSR to a second CSR, a transcript of the communication session between the customer and the first CSR may be sent to the second CSR. This way, the second CSR may understand the context of the communication session. The second CSR may obtain information provided in the communication session before the hand-off.

The AI assistant 101 may be configured to determine to end the communication session between the customer and the CSR. The AI assistant 101 may determine to end the communication session based on a duration of the communication session. The AI assistant 101 may determine to end the communication session based on a number of customers waiting to communicate with a CSR. The AI assistant 101 may determine to end the communication session based on a time that one or more customers has been waiting to communicate with a CSR. Based on the determination to end the communication session, the AI assistant 101 may cue the CSR to end the communication session.

The AI assistant may provide the output directly to a customer. For example, the AI assistant may send the customer a text indication of an output via a device of the customer. The AI assistant may audibly convey the output to the customer, such as using an artificial voice. The artificial voice may be configured to use a voice that is configured to be similar of a voice of a CSR interacting with the customer (e.g., have a similar tone, pace, accent, etc.). For example, the artificial voice may be similar to the voice of the CSR so that the customer cannot distinguish between speech by the CSR and speech by the AI assistant. The artificial voice may be generated using samples of the CSR's voice, such as recordings and or determined characteristics of the CSR's voice. Artificial intelligence may be used to generate the artificial voice. For example, the AI assistant may be fed samples of the CSR's voice and trained on the samples.

Figure 2:
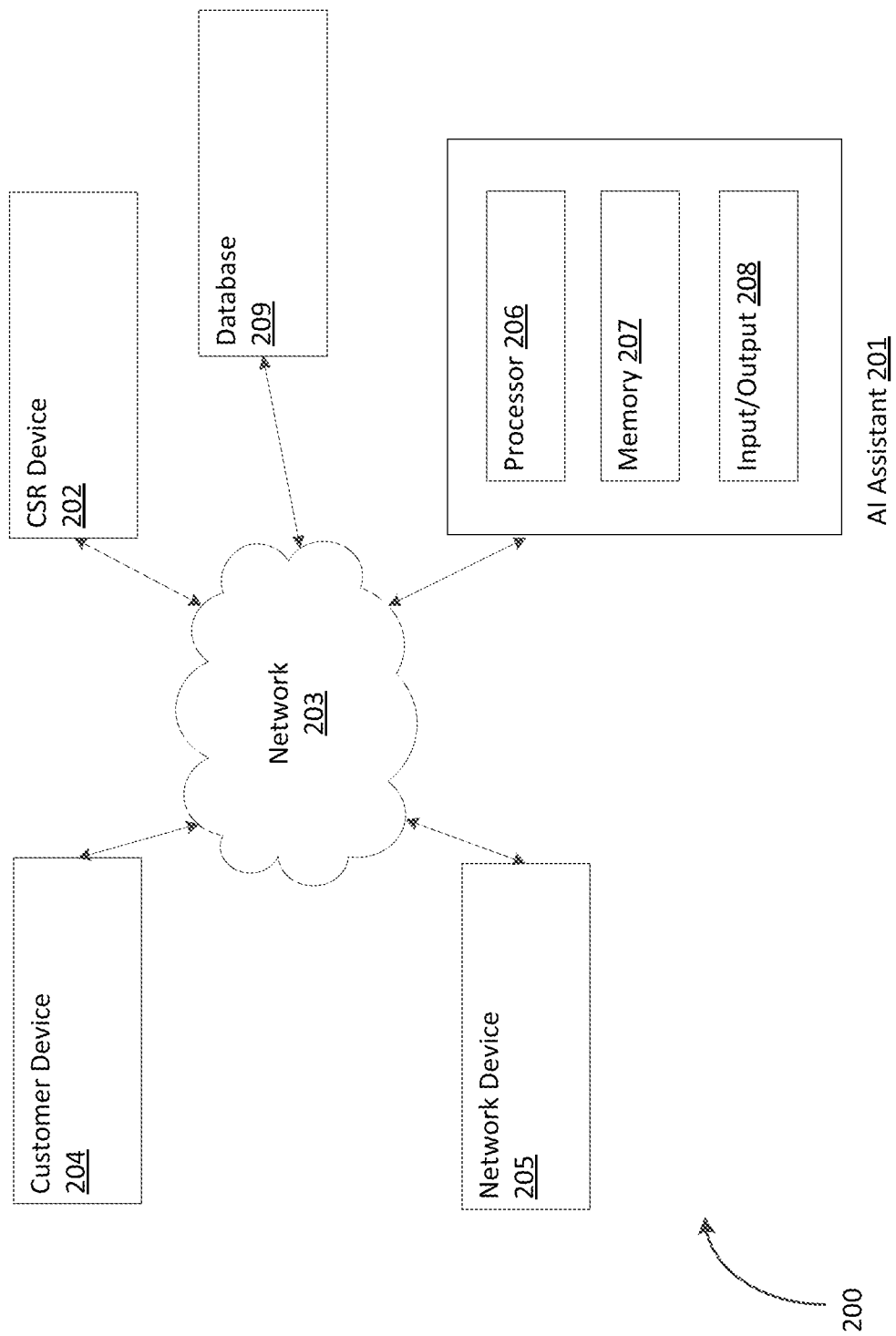
FIG. 2 shows an example AI assistant operating environment.

FIG. 2 shows an example operating environment 200. The operating environment 200 may comprise an AI assistant 201. The AI assistant 201 may comprise a computing device. The computing device may comprise a user device, such as a desktop computer or a laptop computer. The computing device may comprise a server. The computing device may comprise a control center, such as a control center in communication with a plurality of CSR devices and/or customer devices. The computing device may comprise one or more nodes of a cloud computing environment. The AI assistant 201 may comprise software, an application, or a program running on a computing device. For example, the AI assistant 201 may comprise software, an application, or a program running on a computing device of a CSR. The AI assistant 201 may comprise an application builder that generates a program from data fed to the application builder, such as a flowchart.

The AI assistant 201 may comprise a processor 206. The processor 206 may comprise a microprocessor. The processor 206 may comprise a digital signal processor (DSP), such as a DSP chip. The processor 206 may comprise a real-time dialogue-processing component. The AI assistant 201 may comprise memory 207. The memory 207 may comprise on-chip memory. The memory 207 may comprise a portion of a partitioned memory of a computing device, such as a secure portion.

The AI assistant 201 may comprise an input/output component 208. The input/output component 208 may be configured to receive an input, such as one or more of the inputs 102-105 in FIG. 1. The input/output component 208 may be configured to receive the input. The input/output component 208 may comprise a speaker and/or a microphone, as an example.

The AI assistant 201 may comprise an artificial neural network. The AI assistant 201 may comprise a node of an artificial neural network. The AI assistant 201 may be configured to communicate with one or more devices 205 that comprise nodes of an artificial neural network. The artificial neural network may be configured to compile data from a plurality of CSR-customer communication sessions. The artificial neural network may be configured to make determinations based on the compiled data, such as using predictive analysis. For example, the artificial neural network may be configured to determine that, based on an input, a customer is likely to purchase a service or product. The AI assistant 201 may be configured to prompt the CSR to recommend the service or product to the customer.

The artificial neural network may be configured to determine patterns in the CSR-customer communication sessions. For example, the artificial neural network may be configured to determine probabilities of success of one or more outputs. Success may be measured based on customer satisfaction ratings, sale of a product and/or service, revenue generated, and/or revenue lost associated with the output, as examples. The probabilities of success of the outputs may be in response to one or more inputs. The artificial neural network may be configured to map one or more outputs to one or inputs (e.g., key words in the input) or characteristics of an input (e.g., tone, emotion, meaning).

A table comprising the mapped inputs and/or outputs may be generated, such as by the AI assistant 201 and/or the artificial neural network. The table may comprise one or more key words and/or characteristics of an input. The characteristics of the input may be represented by a classification code used by the AI assistant 201 to classify the characteristics. The mapping may be based on the determined probabilities of success. The AI assistant 201 may be configured to use the probabilities and/or mapping to determine an output.

The AI assistant 201 may be configured to be taught to process the inputs. The AI assistant 201 may be fed a training set of data. The training set of data may comprise data associated with an industry. The industry may be associated with a business of the CSR. For example, the training set of data may comprise an employee training manual, business vocabulary, and/or data associated with historical customer communication sessions. The training set of data may comprise one or more inputs. The training set of data may comprise one or more outputs associated with the inputs. The training set of data may comprise one or more input classification codes. The training set may comprise one or more outputs associated with the classification codes.

The AI assistant 201 may be configured to be trained on a database 209. The database 209 may comprise a database of field data. The AI assistant 201 may be configured to self-learn, such as by learning based on previously received inputs. The AI assistant 201 may be configured to self-learn based on previously delivered outputs. The AI assistant 201 may be configured to self-learn based on the results (e.g., success) of previously delivered outputs, such as in response to inputs. For example, based on outcomes of previous communication sessions, the AI assistant 201 may learn to adjust the outputs for certain inputs. As an illustrative example, the AI assistant 201 may determine that an output resulted in waiver of fees a number of times. Based on the waiving of fees the number of times, the AI assistant may determine a different output a subsequent time and/or that to associate a different output with the received input. The AI assistant 201 may be configured to be taught and/or to learn based on inputs and/or results of determined outputs of in an artificial neural network.

The AI assistant 201 may be configured to communicate with a device 202 associated with a CSR. The CSR device 202 may comprise a computing device. The CSR device 202 may comprise a user device, such as a mobile phone, a tablet, a laptop computer, and/or a desktop computer. The AI assistant 201 may communicate with the CSR device 202 via a network 203. The network 203 may comprise an Internet network. The network 203 may comprise a local area network (LAN) or a wide area network (WAN), as examples. The network 203 may comprise a public switched telephone network (PSTN), a broadband network, a mobile network, and/or a digital cellular network (e.g., 3G, 4G, 5G, etc.) as examples.

The AI assistant 201 may be configured to receive one or more inputs from the CSR device 202. The AI assistant 201 may be configured to send one or more outputs to the CSR device 202. The AI assistant 201 may be configured to access a workflow running on the CSR device 202. The AI assistant 201 may be configured to receive one or more inputs and/or send one or more outputs via the workflow. The AI assistant 201 may be configured to access a text, chat, and/or messaging program running on the CSR device 202. The AI assistant 201 may be configured to receive one or more inputs from the messaging program. The AI assistant 201 may be configured to send one or more outputs via the text, chat, and/or messaging program.

The AI assistant 201 may be configured to communicate with a device 204 associated with a customer. The customer device 204 may comprise a computing device. The customer device 204 may comprise a user device, such as a mobile phone, a tablet, a laptop computer, and/or a desktop computer. The AI assistant 201 may be configured to communicate with the customer device 204 via the network 203. The AI assistant 201 may be configured to receive one or more inputs from the customer device 204. The AI assistant 201 may be configured to send one or more outputs to the customer device 204.

The CSR device 202 may be configured to communicate with the customer device 204. The CSR device 202 may be configured to communicate with the customer device via the network 203. The CSR device 202 may be configured to communicate with the customer device 204 via a text, chat, and/or messaging program running on the CSR device 202 and/or the customer device 204. The AI assistant 201 may be configured to access the text, chat, and/or messaging program. The AI assistant 201 may be configured to receive one or more inputs from the messaging program and/or send one or more outputs via the chat and/or messaging program.

The CSR device 202 may be configured to communicate with the customer device 204 via an audio (e.g., voice) and/or video call. The call may be between a customer and a CSR. The AI assistant 201 may have access to the call. For example, the AI assistant 201 may be configured to listen-in on the call and/or to be on the call. The AI assistant 201 may be configured to receive one or more inputs from the call and/or send one or more outputs via the call.

The AI assistant 201 may be configured to communicate with one or more network devices 205. The network device 205 may comprise a node of a cloud computing network. The network device 205 may comprise a node of an artificial neural network. The AI assistant 201 may be configured to communicate with the network device 205 via the network 203.

Figure 3:
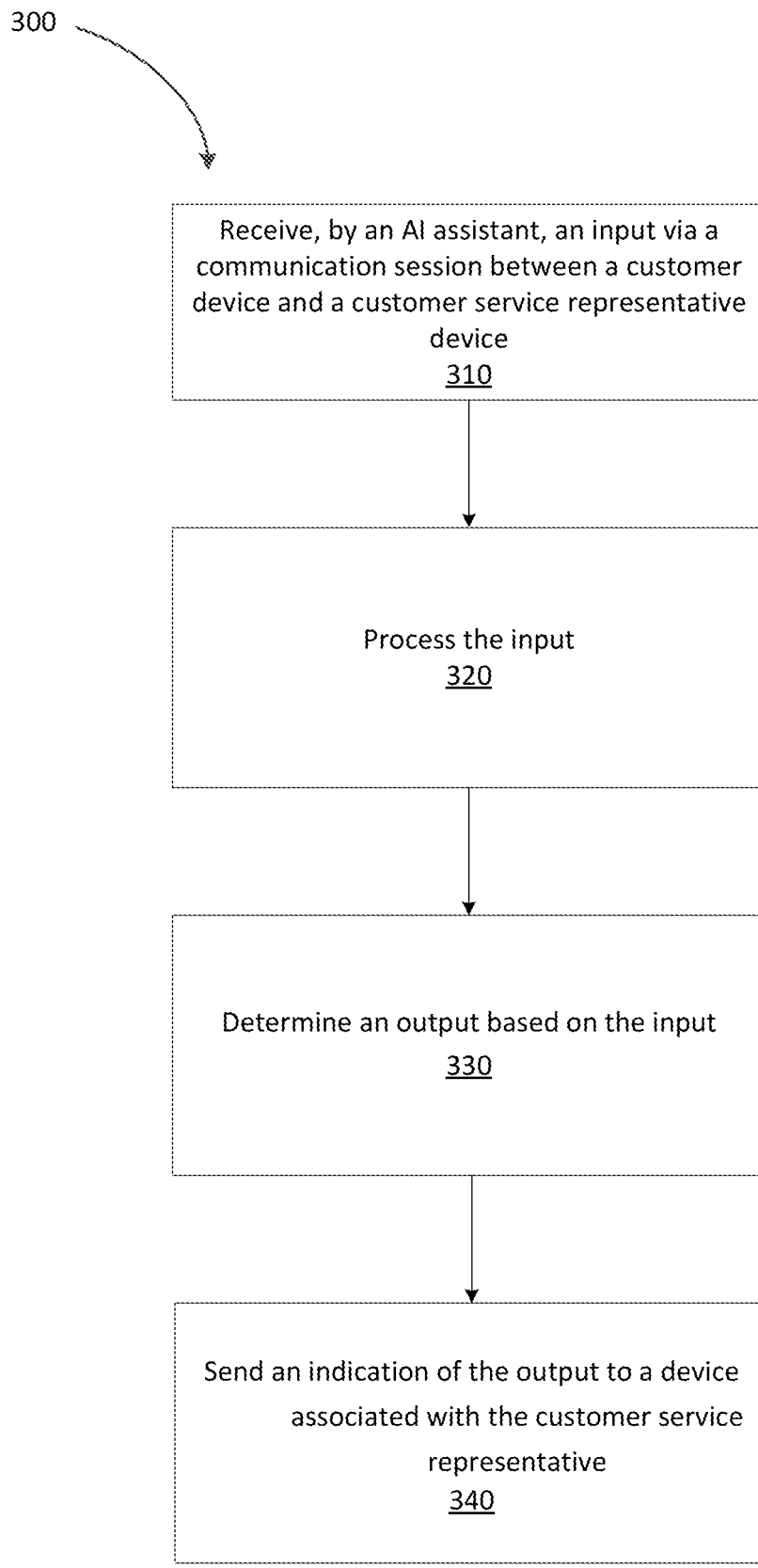
FIG. 3 shows an example AI assistant method.

FIG. 3 shows an example method 300. At step 310, one or more inputs may be received. The input may be received by an AI assistant (e.g., the AI assistant 101 in FIG. 1 and/or the AI assistant 201 in FIG. 2). The input may be associated with a customer. The input may be received from a device associated with the customer (e.g., the customer device 204 in FIG. 2). The input may be associated with a CSR. The input may be received from a device associated with the CSR (e.g., the CSR device 202 in FIG. 2). The input may be received via a communication session between the customer device and the CSR device.

The input may comprise a speech input (e.g., the speech input 102 in FIG. 1). speech input 102 may be received via an audio (e.g., voice) and/or video call, such as between the CSR and the customer. The speech input may comprise speech of the CSR. The speech input may comprise speech of the customer.

The input may comprise a text input (e.g., the text input 103 in FIG. 1). The text input may be received from the customer and/or the CSR. The text input may be received via a texting, chat, and/or messaging program running on the customer device and/or the CSR device. The text input may be received via a chat and/or messaging program running on the customer device and/or the CSR device.

The input may comprise a UI input (e.g., UI input 104 in FIG. 1). The UI input 104 may be received via a user interface (UI). The UI may comprise a graphic user interface (GUI). The UI input 104 may comprise a selection (e.g., a mouse selection, a touchscreen selection) of an option on a menu displayed on the UI. The UI input 104 may comprise text input in a field displayed on the UI. The UI may comprise a non-graphic user interface, such as a UI associated with a digital assistant. The UI input 104 may comprise a voice communication, such as a command or a selection to a digital assistant.

The input may comprise a CSR workflow (e.g., CSR workflow 105 in FIG. 1). The CSR workflow may comprise a UI (e.g., GUI), an application, and/or another program running on the CSR device. The CSR workflow may comprise a flowchart. The CSR workflow may show steps. The CSR workflow may show a sequence of question, answers, and/or statements. The CSR workflow may indicate questions for the CSR to ask the customer. The CSR workflow may indicate possible user responses to the CSR questions. The CSR workflow may indicate a follow-up statement to each of the possible user responses. The CSR may interact with the CSR workflow, such as to track the CSR's progress through the workflow. The AI assistant may track the CSR's progress through the workflow, such as based on the CSR's tracking and/or other input indicative of the CSR's progress in the workflow.

At step 320, the one or more inputs may be processed. The input may be processed by the AI assistant. Processing the one or more inputs may comprise determining one or more characteristics of the input. The characteristics may comprise one or more of a tone, emotion, key word, meaning, and/or context of the input. Processing the one or more inputs may comprise determining a change in one or more of the aforementioned characteristics. Processing the one or more inputs may comprise assigning the input one or more classification codes, such as based on one or more of the characteristics. The classification code may comprise a binary code, an alphanumeric code, and/or a symbol code.

If the input comprises speech input, processing the speech input may comprise using automatic speech recognition (ASR), computer speech recognition, speech to text (STT), natural language processing (NLP), and/or other speech recognition technology. Processing the speech input may comprise determining words used in the speech input. Processing the speech input may comprise extracting key words from the speech input. Processing the speech input may comprise contextually analyzing the words, such as to correct similar-sounding words, to determine emotion associated with the words, and/or to determine meaning of the speech input.

Processing the speech input may comprise determining a volume of the speech input. Processing the speech input may comprise determining a pace of the speech input. Processing the speech input may comprise determining a pitch of the speech input. Processing the speech input may comprise determining an inflection of the speech input. Processing the speech input may comprise determining a tone and/or emotion associated with the speech input. The tone and/or emotion may be determined based on the words used, volume, pace, inflection, and/or pitch of the speech input. Processing the speech input may comprise determining a change in the speech input, such as based on a change in the words used, volume, pace, inflection, and/or pitch of the speech input. Processing the speech input may comprise translating the speech input from one language to another language, such as before performing further processing on the speech input. Processing the speech input may comprise translating the speech input from one language to another language. For example, the AI assistant may translate the speech input from a language spoken by the customer to a language spoken by the CSR.

If the input comprises text input, processing the text input may comprise using NLP and/or other speech recognition technology. Processing the text input may comprise determining words used in the text input. Processing the text input may comprise extracting key words from the text input. Processing the text input may comprise contextually analyzing the words, such as to correct similar-sounding words, to determine emotion associated with the words, and/or to determine meaning and/or emotion associated with the text input. Processing the text input may comprise determining a change associated with the text input, such as a change in emotion associated with the text input. Processing the text input may comprise translating the text input from one language to another language, such as before performing further processing on the text input. Processing the text input may comprise translating the text input from one language to another language. For example, the AI assistant may translate the text input from a language spoken by the customer to a language spoken by the CSR.

If the input comprises a UI input, processing the UI input may comprise using a speech recognition technology. Processing the UI input may comprise determining words used in the UI input. Processing the UI input may comprise extracting key words from the UI input. processing the UI input may comprise contextually analyzing the words, such as to correct similar-sounding words, to determine emotion associated with the words, and/or to determine meaning associated with the UI input.

If the input comprises a CSR workflow, processing the CSR workflow may comprise determining a statement (e.g., a question, response, and/or other information) that the CSR has communicated, is communicating, or will communicate to the customer. Processing the CSR workflow may comprise determining possible customer responses to a question. Processing the CSR workflow may comprise determining a follow-up statement to a customer statement. Processing the CSR workflow may comprise tracking the CSR's progress through the workflow.

Processing the input may comprise communicating with an artificial neural network. The AI assistant may send an indication of the input to one or more nodes of the artificial neural network. An indication of one or more characteristics of the input may be received from the neural network. Processing the input may comprise comparing the input to data compiled by the artificial neural network. The data may comprise other inputs, such as inputs received by and/or from other devices and/or inputs received from other communication sessions. The data may comprise characteristics and/or classification codes associated with other inputs.

Initially, the communication session may be between the customer's device and the AI assistant. Based on the input, the AI assistant may determine to hand-off the communication session to the CSR. For example, if the AI assistant is unable to determine a response, the AI assistant may hand-off the communication session to the CSR. As another example, if the customer's input exhibits a negative emotion, the AI assistant may hand-off the communication session to the CSR.

At step 330, an output may be determined. The output may be determined by the AI assistant. The output may be determined based on the one or more inputs. The output may be determined based on the determined characteristics of the input. The output may be determined based on the classification code assigned to the input. The output may be determined based on customer information, such as an account of the customer or a history of transactions and/or communication sessions of the customer. The output may be determined based on a mapping and/or table of inputs (e.g., input characteristics, input classification codes, etc.) and outputs. The output may be determined based on data received from an artificial neural network. The output may be determined based on a determined probability success of an output. The output may be determined based on other communication sessions (e.g., with the customer and/or other customers). The output may be determined using predictive analysis.

The output may comprise a suggested CSR statement (e.g., the suggested CSR statement 106 in FIG. 1). The suggested CSR statement may comprise a response to a customer question. For example, if the CSR is associated with an insurance company and the customer is calling the insurance company to ask if their insurance plan has a certain type of coverage, the AI assistant may output a response indicating if the customer's plan has that type of coverage. The suggested CSR statement may comprise useful information. For example, if the customer is calling the insurance company to file an insurance claim, the AI assistant may output information about a deductible associated with the customer's insurance plan. The suggested CSR statement may comprise a new question for the CSR to ask the customer. The new question may be a next question on the CSR workflow. The AI assistant may determine the new question based on a determination that further information is needed from the customer. The AI assistant may indicate what information is needed to the CSR and/or formulate the question to solicit the needed information.

The suggested CSR statement may comprise legal information. The legal information may comprise a disclaimer. The legal information may comprise a alert, such as to warn the CSR not to provide certain information or obtain certain information. The legal information may comprise an alert that certain information is sensitive and should be treated as such. For example, the AI assistant may alert the CSR that information provided by the customer is personal identifying information (PII). As a result the CSR, may save the information securely or label it as sensitive. Based on a determination that information is sensitive, the AI assistant may determine if the CSR is authorized to receive the information, such as based on a training level, certification level, and/or license of the CSR. If the CSR is not authorized to receive sensitive information, the AI assistant may cause the communication session to be handed-off to a different CSR, such as a CSR authorized to receive the information. Based on a determination that the CSR is not authorized to receive sensitive information, the AI assistant may censor the information, such as by temporarily silencing audio from the customer to the CSR or preventing the display of the information on the CSR's device. The AI assistant may record the sensitive information, such as in a secure memory and/or database.

The legal information may comprise an alert of potential fraud. Potential fraud may be determined based on speech input of a customer. For example, characteristics of the voice of the customer may be matched to characteristics of a voice of a known fraudster. Alternatively, the AI assistant may determine not to alert of potential fraud if the characteristics of the voice of the customer are matched to characteristics of a voice of a known and/or trusted customer. Potential fraud may be determined based on a number of questions, such as security questions, that the customer answers incorrectly. For example, if the customer answers a certain percentage of questions incorrectly, potential fraud may be determined and the CSR may be alerted.

Potential fraud may be determined based on a means of communication and/or transaction occurring between the customer and the CSR. For example, communication sessions in which the CSR reveals sensitive information (e.g., personal information, account information, card numbers, etc.) to the customer may be considered for fraud. As another example, transactions in which money or another asset is being transferred may be considered for fraud. Potential fraud may be determined based on a destination of a transfer. For example, if the destination is not associated with the customer, potential fraud may be determined.

Potential fraud may be determined based on a customer's history. For example, patterns may be determined in a customer's transaction and/or communication history. The patterns may be based on customer location, time of the communication session, means of communication used, and/or type of transaction, as examples. If a characteristic of the customer-CSR communication session is not consistent with that pattern, potential fraud may be determined. As an illustrative example, if the customer has previously called in the afternoon and a call is placed at night, it may be determined that the time of call is not consistent with an established call time pattern and potential fraud may be determined. As another example, if the customer usually communicates using a device and a communication session is initiated using a different device, potential fraud may be determined. As yet another example, if a customer usually performs certain transactions and the customer initiates a different transaction, potential fraud may be determined.

Based on a determination of potential fraud, the CSR may be alerted. The CSR may be prompted to terminate the communication session. The CSR may be prompted to authenticate the customer, such as by asking the customer verification and/or security questions. Based on the customer's responses to the verification and/or security questions, fraud may be confirmed and/or the customer may be verified. Based on the determination of potential fraud, an alert may be sent to a known device and/or number of the customer.

The legal information may be directly output by the AI assistant to the customer. For example, if the legal information is a disclaimer, the AI assistant may output the legal information to the customer instead of the CSR communicating the disclaimer to customer. This way, it may be ensured that the legal information will be communicated correctly. The legal information may be output to the customer using an artificial voice configured to mimic the voice of the CSR. From the perspective of the customer, the voice of the AI assistant and the voice of the CSR may be indistinguishable. After the AI assistant outputs the legal information, the CSR may continue to interact with the customer.

The suggested CSR statement may comprise a suggestion to offer a product or service. For example, the AI assistant may prompt the insurance company CSR to suggest that the customer purchase an additional plan, increase a coverage amount, and/or add a coverage type. The AI assistant may determine to suggest the product or service based on a determination that the customer has positive voice tone. The AI assistant may determine to suggest the product or service based on information associated with the customer. For example, the AI assistant may have access to an account associated with the customer. The AI may have access to a database of customer information. For example, based on the customer information, the AI assistant may determine that the customer does not already have the product or service. The AI assistant may determine to suggest the product or service based on one or more statements of the customer. For example, if the customer inquires about or purchases a similar product or service, the AI assistant may determine to suggest the product or service. The AI assistant may determine to suggest the product or service based on other customers having purchased the product or service and/or having made similar statements.

The output may comprise a correction of a CSR statement (e.g., the CSR statement correction 107 in FIG. 1). The correction may be of an error in a statement made by the CSR. For example, if the CSR makes an incorrect statement, the correction may comprise a correct version of the statement. The error may comprise an omission. For example, if the CSR does not make a disclaimer, the correction may comprise an indication of the disclaimer. As another example, if the CSR skips a step on the workflow, the correction may comprise an indication of the skipped step. The correction may be determined based on a law or regulation. The correction may comprise information that the CSR must communicate to the customer to be in compliance with the law or regulation.

The output may comprise a tone change suggestion (e.g., the tone change suggestion 108 in FIG. 1). Based on the determined words used by the customer or meaning of the customer input, the AI assistant may determine that the words and/or input are associated with a negative tone and/or emotion. Based on the volume, pace, inflection, and/or pitch of the input, the AI assistant may determine that the volume, pace, inflection, and/or pitch of the input is associated with a negative tone and/or emotion. Based on the negative tone and/or emotion, the AI assistant may suggest that the CSR change their tone. Based on the tone and/or emotion, the AI assistant may dynamically determine CSR statements. For example, the if the tone and/or emotion is positive, the AI assistant may determine an output comprising an offer for another service or product. As another example, if the tone and/or emotion is negative, the AI assistant may determine an output comprising a new subject. The AI assistant may select among a plurality of predetermined outputs based on the determined tone and/or emotion. Each of the plurality of predetermined outputs may have similar meaning, but different wordings and/or diction associated with different tones. Each of the plurality of predetermined outputs may comprise different statements (e.g., questions, responses, useful information, product/service suggestions).

The output may be determined based on communicating with the artificial neural network. For example, the AI assistant may send an indication of the input to one or more nodes of the artificial neural network. The one or more nodes may determine an output associated with the data, such as based on compiled CSR-customer data. The AI assistant may receive an indication of the output from the node.

The output may be determined based on determining a similar input in artificial neural network data. The output may be associated with the similar input. For example, the data may comprise a mapping of inputs (e.g., key words, characteristics, classification codes, etc. of the inputs) to outputs. The output mapped to the similar input may be determined. The data may indicate one or more outputs associated with the input and/or similar input. The data may indicate a probability that the output is associated with and/or responsive to the input and/or similar input. The output may be determined based on the probability. For example, if the data indicates various outputs, the output with the highest probability may be determined.

The output may be determined by searching a database, table, and/or mapping. The search may be performed using one or more key words from the input. The search may be performed using one or more determined characteristics of the input, such as a key word, a tone, an emotion, a meaning, a duration, a volume, pitch, and/or context of the input. The search may be performed using a code used to classify one or more of the characteristics of the input. For example, the AI assistant may classify inputs having a positive tone and/or emotion as +1, inputs having a neutral tone and/or emotion as 0, and inputs having a negative tone and/or emotion as −1.

At step 340, an indication of the output may be sent to the CSR. The indication of the output may be sent via the CSR device. The indication of the output may be sent by the AI assistant. The device associated with the CSR may be similar to the CSR device 202 in FIG. 2. The indication of the output may be displayed as a notification on the CSR device, such as on the CSR workflow. The indication of the output may comprise a text alert. The indication of the output may be visible to the CSR, but not to the customer. The indication of the output may comprise an audio alert, such as via a speaker, an earpiece, or a headpiece. The indication of the output may be audible to the CSR, but not to the customer.

If the CSR is not using a workflow, the indication of the output may be sent to the CSR in lieu of a workflow. For example, rather than follow steps of a workflow, the CSR may follow steps indicated by outputs. Alternatively, the sending the output may be based on a determination that a workflow program is malfunctioning. The sending the output may be based on a determination that the CSR device lost connection, ran out of power, and/or has malfunctioned. If outputs were delivered via the CSR device and the CSR device is experiencing a technical difficulty, the outputs may be delivered via a different means. For example, the indication of the output may be sent via audio, such as through a speaker, headset, or earpiece of the CSR. The indication of the output may be sent to another device of the CSR other than the device experiencing technical difficulties.

A transcript of the communication session between the customer and the CSR may be generated. A copy of the transcript may be saved, such as to a database. The transcript may be sent to the customer, the CSR, a supervisor of the CSR, or another entity. If a hand-off occurs of the customer from a first CSR to a second CSR, a transcript of the communication session between the customer and the first CSR may be sent to the second CSR. This way, the second CSR may understand the context of the communication session. The second CSR may obtain information provided in the communication session before the hand-off.

The AI assistant may determine to hand-off the communication session to another CSR. For example, the AI assistant may determine to hand-off the communication session based on a topic raised in the communication session. If the CSR is not qualified to address the topic or is not in a position that is assigned to a department or matters associated with the topic, the communication session may be handed-off to a CSR that is qualified or is assigned to a department or matters associated with the topic. Based on the determination to hand-off the communication session, the AI assistant may cue the CSR to initiate the hand-off. Based on the determination to hand-off the communication session, the AI assistant cause the communication session to be transferred, such as by terminating communication between the customer's device and the first CSR's device and/or establishing a connection between the customer's device and the second CSR's device.

The AI assistant may determine to hand-off the communication session to another CSR. For example, the AI assistant may determine to hand-off the communication session based on a topic raised in the communication session. If the CSR is not qualified to address the topic or is not in a position that is assigned to a department or matters associated with the topic, the communication session may be handed-off to a CSR that is qualified or is assigned to a department or matters associated with the topic. Based on the determination to hand-off the communication session, the AI assistant may cue the CSR to initiate the hand-off. Based on the determination to hand-off the communication session, the AI assistant cause the communication session to be transferred, such as by terminating communication between the customer's device and the first CSR's device and/or establishing a connection between the customer's device and the second CSR's device.

The AI assistant may determine to end the communication session between the customer and the CSR. The AI assistant may determine to end the communication session based on a duration of the communication session. The AI assistant may determine to end the communication session based on a number of customers waiting to communicate with a CSR. The AI assistant may determine to end the communication session based on a time that one or more customers has been waiting to communicate with a CSR. Based on the determination to end the communication session, the AI assistant may cue the CSR to end the communication session.

Figure 4:
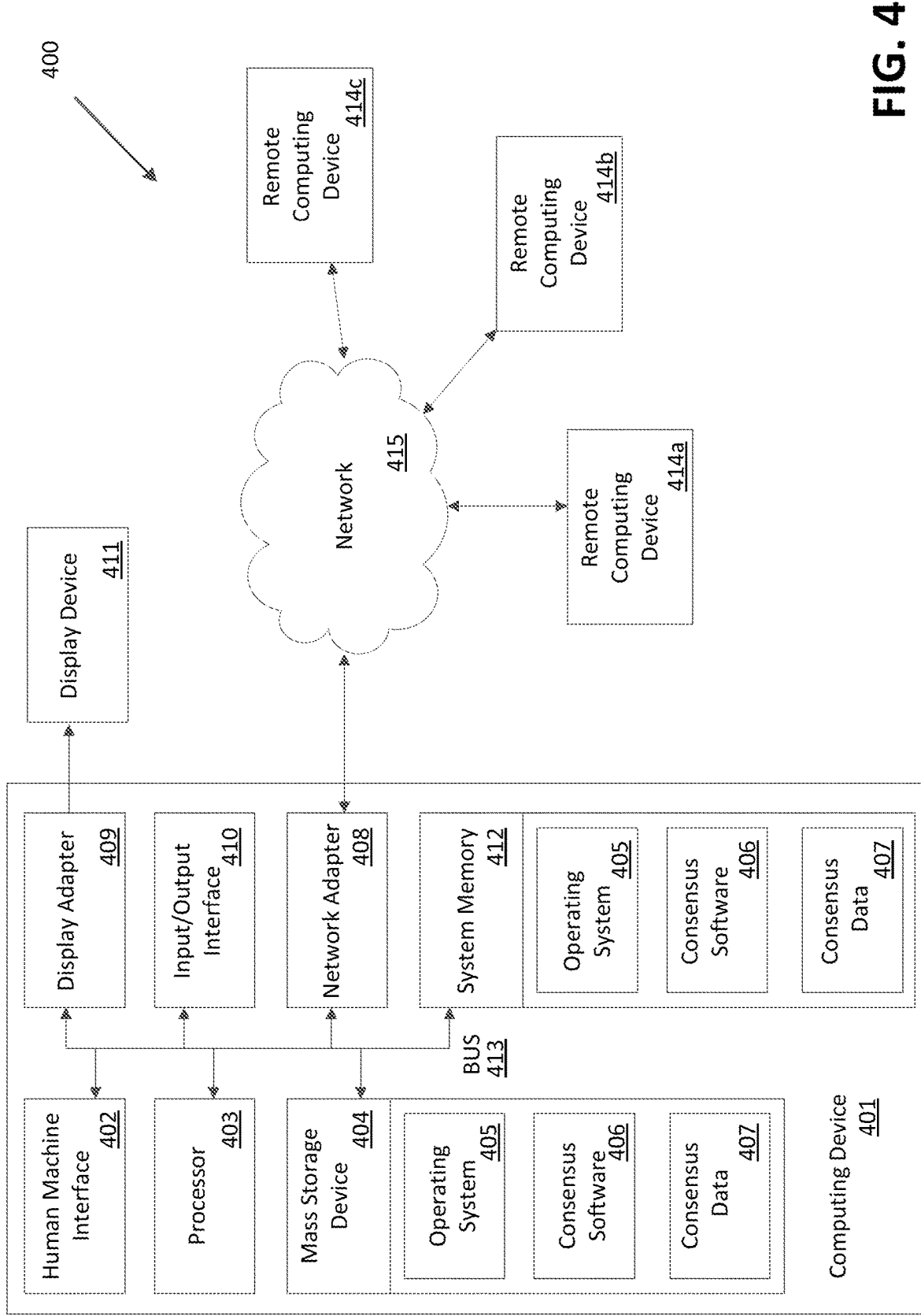
FIG. 4 shows an example AI assistant computing environment.

FIG. 4 shows an example computing environment. The systems, methods, and/or apparatuses described herein may be implemented on a computing device such as a computing device 401. The AI assistant 101 in FIG. 1, the AI assistant 201, the customer device 204, the CSR device 202, and/or the network device 205 in FIG. 2 may comprise the computing device 401. Similarly, the methods, systems, and/or apparatuses disclosed may utilize one or more computing device to perform one or more functions in one or more locations. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and/or apparatuses.

The systems, methods, and apparatuses may be implemented, in whole or in part, by software components. The disclosed methods, systems, and/or apparatuses may be described in the general context of computer-executable instructions, such as program modules, being executed by one or more computers or other devices. Program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and/or apparatuses may be implemented via a general-purpose computing device in the form of a computing device 401. The components of the computing device 401 may comprise, but are not limited to, one or more processors 403, a system memory 412, and a system bus 413 that couples various system components including the processor 403 to the system memory 412. With multiple processors 403, the system may utilize parallel computing.

The system bus 413 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 413, and all buses specified in this description may be implemented over a wired or wireless network connection and each of the subsystems, including the processor 403, a mass storage device 404, an operating system 405, data distillation software 406, data distillation data 407, a network adapter 408, system memory 412, an Input/Output Interface 410, a display adapter 409, a display device 411, and a human machine interface 402, may be contained within one or more remote computing devices 414a,b,c at physically separate locations, connected through buses of this form, in effect implementing a fully distributed system.

The computing device 401 typically comprises a variety of computer readable media. Readable media may be any available media that is accessible by the computing device 401 and comprises both volatile and non-volatile media, removable and non-removable media. The system memory 412 comprises computer readable media in the form of volatile memory, such as random access memory (RAM), and/or non-volatile memory, such as read only memory (ROM). The system memory 412 typically contains data such as data distillation data 407 and/or program modules such as operating system 405 and data distillation software 406 that are immediately accessible to and/or are presently operated on by the processor 403.

The computing device 401 may comprise other removable/non-removable, volatile/non-volatile computer storage media. FIG. 4 shows a mass storage device 404 which may provide non-volatile storage of computer code, computer readable instructions, data structures, program modules, and other data for the computing device 401. A mass storage device 404 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 404, including an operating system 405 and data distillation software 406. Each of the operating system 405 and data distillation software 406 (or some combination thereof) may comprise elements of the programming and the data distillation software 406. Data distillation data 407 may be stored on the mass storage device 404. Data distillation data 407 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 401 via an input device (not shown). Input devices may comprise, but are not limited to, a keyboard, pointing device (e.g., a "mouse"), a microphone, a joystick, tactile input devices such as gloves, and other body coverings, and the like. These and other input devices may be connected to the processor 403 via a human machine interface 402 that is coupled to the system bus 413, but may be connected by other interface and bus structures, such as a parallel port, game port, an IEEE 494 Port (also known as a Firewire port), a serial port, or a universal serial bus (USB).

A display device 411 may be connected to the system bus 413 via an interface, such as a display adapter 409. It is contemplated that the computing device 401 may have more than one display adapter 409 and the computing device 401 may have more than one display device 411. A display device may be a monitor, an LCD (Liquid Crystal Display), or a projector. Output peripheral devices may comprise components such as speakers (not shown) and a printer (not shown) which may be connected to the computing device 401 via Input/Output Interface 410. Any step and/or result of the methods may be output in any form to an output device. Such output may be any form of visual representation, including, but not limited to, textual, graphical, animation, audio, tactile, and the like. The display 411 and computing device 401 may be part of one device, or separate devices.

The computing device 401 may operate in a networked environment using logical connections to one or more remote computing devices 414a,b,c. A remote computing device may be a personal computer, portable computer, smartphone, a server, a router, a network computer, a peer device or other common network node, and so on. Logical connections between the computing device 401 and a remote computing device 414a,b,c may be made via a network 415, such as a local area network (LAN) and a general wide area network (WAN). Such network connections may be through a network adapter 408. A network adapter 408 may be implemented in both wired and wireless environments. Such networking environments are conventional and commonplace in dwellings, offices, enterprise-wide computer networks, intranets, and the Internet.

Application programs and other executable program components such as the operating system 405 are shown herein as discrete blocks, although it is recognized that such programs and components reside at various times in different storage components of the computing device 401, and are executed by the data processor(s) of the computer. An implementation of data distillation software 406 may be stored on or transmitted across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:

1. A method comprising:
   receiving, by an artificial intelligence (AI) assistant, an input via a communication session between a customer device and a customer service representative device, wherein the AI assistant is trained using machine learning on a database containing previously-received inputs, previously-delivered outputs, and previous results of previously-delivered outputs;
   processing, by the AI assistant, the input;
   determining, by the processing, that at least a portion of the input includes sensitive information;
   determining an authorization level of the customer service representative for the sensitive information;
   determining, by the AI assistant, an output based on the processing of the input, wherein the output includes one of a suggested statement, change in tone, or correction for the customer service representative; and
   sending, by the AI assistant, an indication of the output to the customer service representative device, wherein the output is censored to redact at least a portion of the sensitive information if the authorization level is below a level required to receive the sensitive information.

2. The method of claim 1, wherein the indication of the output comprises at least one of causing a window comprising a text alert or an audio output.

3. The method of claim 1, comprising:
   storing the sensitive information to a secure database.

4. The method of claim 1,
   wherein the processing the input comprises determining that a voice of the input matches a known voice of a user, and
   wherein the determining the output is based at least on an identity of the user.

5. The method of claim 1, further comprising putting the customer device in communication with another customer service representative device.

6. The method of claim 1, wherein the output comprises an indication of fraud.

7. The method of claim 1, wherein the processing the input comprises translating the input from one language to another language.

8. The method of claim 1, comprising:
   determining a result of the output; and
   storing at least a portion of the input, the output, and the result of the output to the database, wherein at least the portion of the input, the output, and the result are stored as previously-received inputs, previously-delivered outputs, and previous results.

9. An artificial intelligence (AI) assistant configured to:
   receive an input via a communication session between a customer device and a customer service representative device, wherein the AI assistant is trained using machine learning on a database containing previously-received inputs, previously-delivered outputs, and previous results of previously-delivered outputs;
process the input using at least the artificial intelligence;
determine, based on processing the input using at least the artificial intelligence, that at least a portion of the input includes sensitive information;
determine an authorization level of the customer service representative for the sensitive information;
determine an output based on the processing of the input, wherein the output includes one of a suggested statement, change in tone, or correction for the customer service representative; and
send an indication of the output to the customer service representative device, wherein the output is censored to redact at least a portion of the sensitive information if the authorization level is below a level required to receive the sensitive information.

10. The AI assistant of claim 9, wherein the communication session comprises at least one of a web chat session, a text message, a selection via a user interface, or a voice communication.

11. The AI assistant of claim 9, wherein the output comprises a request for information.

12. The AI assistant of claim 9, wherein the processing the input comprises performing at least one of automatic speech recognition (ASR), computer speech recognition, or natural language processing (NLP).

13. The AI assistant of claim 9, wherein the processing the input comprises determining a tone associated with the input; and
wherein the output comprises a suggestion to change tone.

14. The AI assistant of claim 9, wherein the AI assistant comprises a machine learning (ML) algorithm trained on inputs and outputs.

15. A non-transitory computer-readable storage medium comprising instructions that, when executed, cause operations comprising:
receiving, by an artificial intelligence (AI) assistant, an input via a communication session between a customer device and a customer service representative device, wherein the AI assistant is trained using machine learning on a database containing previously-received inputs, previously-delivered outputs, and previous results of previously-delivered outputs;
processing, by the AI assistant, the input;
determining, by the processing, that at least a portion of the input includes sensitive information;
determining an authorization level of the customer service representative for the sensitive information;
determining, by the AI assistant, an output based on the processing of the input, wherein the output includes one of a suggested statement, change in tone, or correction for the customer service representative; and
sending, by the AI assistant, an indication of the output to the customer service representative device, wherein the output is censored to redact at least a portion of the sensitive information if the authorization level is below a level required to receive the sensitive information.

16. The non-transitory computer-readable storage medium of claim 15, wherein the determining the output is further based on an identity of a user associated with the customer device.

17. The non-transitory computer-readable storage medium of claim 15, wherein the sending the indication of the output to the customer service representative device comprises sending the indication of the output to the customer service representative device and to the customer device.

18. The non-transitory computer-readable storage medium of claim 15, wherein the AI assistant comprises one or more computing devices external to the customer device and the customer service representative device.

19. The non-transitory computer-readable storage medium of claim 15, wherein the instructions, when executed, cause operations comprising:
determining that the customer service representative made an incorrect statement or omitted a statement, wherein the output comprises a correction to the incorrect statement or an instruction to provide the omitted statement.

20. The non-transitory computer-readable storage medium of claim 15, wherein the instructions, when executed, cause operations comprising:
determining, by the processing, a change in tone of the communication session between the customer service representative and the customer, wherein the change in tone is based on analyzing words used, volume, pace, inflection, and pitch,
wherein the output is based on the change in tone.

* * * * *